US012774780B2

(12) United States Patent
Jang et al.

(10) Patent No.: US 12,774,780 B2
(45) Date of Patent: Oct. 27, 2026

(54) VARIABLE VOLUME HYDROGEN CONTAINER OR HYDROGEN COMPRESSOR WITH IMPROVED HYDROGEN EMBRITTLEMENT RESISTANCE

(71) Applicant: ENERGYN INC., Hwaseong-si (KR)

(72) Inventors: Jin Suk Jang, Incheon (KR); Ihn Kee Hwang, Incheon (KR)

(73) Assignee: ENERGYN INC., Hwaseong-si (KR)

( * ) Notice: Subject to any disclaimer, the term of this patent is extended or adjusted under 35 U.S.C. 154(b) by 493 days.

(21) Appl. No.: 18/525,874

(22) Filed: Dec. 1, 2023

(65) Prior Publication Data

US 2025/0137586 A1 May 1, 2025

(30) Foreign Application Priority Data

Oct. 31, 2023 (KR) ........................ 10-2023-0148414

(51) Int. Cl.
*F17B 1/14* (2006.01)
*F17B 1/12* (2006.01)
*F17B 1/26* (2006.01)

(52) U.S. Cl.
CPC .................. *F17B 1/14* (2013.01); *F17B 1/12* (2013.01); *F17B 1/26* (2013.01)

(58) Field of Classification Search
CPC ................. F17B 1/14; F17B 1/12; F17B 1/26
See application file for complete search history.

(56) References Cited

U.S. PATENT DOCUMENTS 3,140,006 A * 7/1964 Nelson ...................... F17C 1/04
220/586
3,184,092 A * 5/1965 George ..................... F17C 1/06
156/169

(Continued)

FOREIGN PATENT DOCUMENTS

CN 112762348 A 5/2021
DE 102013016696 A1 * 4/2015 ................ F17C 5/00

(Continued)

OTHER PUBLICATIONS

Machine Translation of JP-2006316934-A (May 14, 2026) (Year: 2026).*

(Continued)

*Primary Examiner* — Matthew J Merkling
(74) *Attorney, Agent, or Firm* — Revolution IP, PLLC

(57) ABSTRACT

Disclosed is a variable volume hydrogen container or hydrogen compressor including a variable vessel configured to expand due to hydrogen filling and to compress or discharge the hydrogen while contracting, a pressure vessel configured to receive the variable vessel, at least one of opposite ends of the pressure vessel being open, a vessel wire wound around the pressure vessel in a radial direction, a vessel cap configured to seal the at least one open end of the pressure vessel, a vessel frame configured to support a vessel assembly constituted by the vessel cap and the pressure vessel, a frame wire wound around the circumference of the vessel frame, an embrittlement blocking member disposed so as to overlap the vessel cap, the embrittlement blocking member being configured to block hydrogen from penetrating into the vessel cap, and a transmitted hydrogen discharge hole configured to discharge hydrogen to the outside.

12 Claims, 5 Drawing Sheets

(56) References Cited

U.S. PATENT DOCUMENTS

| | | | | |
|---|---|---|---|---|
| 3,231,338 A * | 1/1966 | Andrus | B21D 51/24 220/587 |
| 3,785,040 A * | 1/1974 | Pechacek | B21D 51/24 220/586 |
| 2009/0095796 A1* | 4/2009 | Prakash | F17C 1/06 228/184 |
| 2013/0315818 A1* | 11/2013 | Roy | F04B 39/0011 261/37 |
| 2015/0165710 A1* | 6/2015 | Jang | B22F 3/03 425/405.2 |
| 2018/0073683 A1* | 3/2018 | Takemoto | F17C 13/04 |

FOREIGN PATENT DOCUMENTS

| | | | | |
|---|---|---|---|---|
| EP | 0367584 A2 * | 5/1990 | G21C 13/10 |
| JP | 2006316934 A * | 11/2006 | |
| JP | 2021-60100 A | 4/2021 | |
| KR | 10-2145975 B1 | 8/2020 | |
| KR | 10-2287932 B1 | 8/2021 | |
| KR | 10-2330581 B1 | 12/2021 | |
| KR | 10-2487016 B1 | 1/2023 | |
| KR | 10-2563976 B1 | 8/2023 | |

OTHER PUBLICATIONS

Machine Translation of DE-102013016696-A1 (May 14, 2026) (Year: 2026).*

* cited by examiner

VARIABLE VOLUME HYDROGEN CONTAINER OR HYDROGEN COMPRESSOR WITH IMPROVED HYDROGEN EMBRITTLEMENT RESISTANCE

BACKGROUND OF THE INVENTION

Field of the Invention

The present invention relates to a hydrogen container that is filled with hydrogen or a hydrogen compressor that compresses hydrogen.

Description of the Related Art

In general, hydrogen combines with oxygen to form a very small amount of nitrogen and water when burned. Hydrogen is one of the cleanest energy sources to replace oil and coal because hydrogen does not pollute the environment.

Hydrogen is an alternative energy source that can be used in a variety of ways, such as providing power through the explosive force of combustion or generating electricity through chemical reaction. Since hydrogen can easily explode upon reaction with oxygen, however, it is difficult to store and handle hydrogen.

In order to solve this problem, a conventional high-pressure gas container is disclosed in Korean Registered Patent No. 10-2330581 (published on Dec. 1, 2021).

The high-pressure gas container includes a cylindrical container body having at least one open end, a container reinforcement wire wound around the container body in a radial direction to increase the rigidity of the container body, a container lid coupled to the open end of the container body to seal the container body, the container lid being made of a material having corrosion resistance to gas for filling, a yoke seated on the container lid, the yoke being made of a material having no corrosion resistance cheaper than the material of the container lid, the yoke having a convex curved surface including a semicircle formed so as to face in a direction toward the outside of the container lid, and a lid reinforcement wire wound around the circumference of the container body in a longitudinal direction via the yoke, the lid reinforcement wire being configured to prevent the container lid from being separated from the container body due to the pressure of the gas stored in the container body by filling.

In the conventional high-pressure gas container, the container reinforcement wire is wound on the container body and the lid reinforcement wire is wound on the yoke in order to prevent explosion of the container body.

In the conventional high-pressure gas container, however, the pressure in the container decreases as the capacity of hydrogen with which the container is filled decreases, whereby the pressure at which hydrogen is discharged decreases, and therefore it is not possible to supply hydrogen at a uniform pressure. In addition, durability of the conventional high-pressure gas container against high pressure is improved; however, the container is vulnerable to hydrogen embrittlement, whereby the container is easily damaged. For example, cracks are easily formed in the container.

In order to solve the above problems, Korean Registered Patent Publication No. 10-2487016, filed by the applicant of the present application, discloses a variable volume hydrogen container or hydrogen compressor with improved hydrogen embrittlement resistance.

In the variable volume hydrogen container or hydrogen compressor with improved hydrogen embrittlement resistance, a variable vessel is installed in a pressure vessel to discharge hydrogen at a constant pressure.

However, the variable volume hydrogen container or hydrogen compressor with improved hydrogen embrittlement resistance has a problem that, when pressure is applied by the variable vessel, hydrogen penetrates into the vessel cap, which has a relatively large thickness, whereby the vessel cap is damaged by hydrogen embrittlement.

In addition, the vessel cap is made of a material having hydrogen embrittlement resistance in order to prevent hydrogen embrittlement, whereby the production costs are high.

Prior Art Documents

Patent Documents (Patent Document 0001) KR 10-2330581 B1
(Patent Document 0002) KR 10-2487016 B1
(Patent Document 0003) KR 10-2563976 B1

SUMMARY OF THE INVENTION

The present invention has been made in view of the above problems, and it is an object of the present invention to provide a variable volume hydrogen container or hydrogen compressor with improved hydrogen embrittlement resistance configured such that a variable vessel, the volume of which is variable, is installed in a pressure vessel, whereby it is possible to discharge hydrogen stored in the variable vessel by filling at a constant pressure until all of the hydrogen is discharged, and variable vessel is capable of performing a function of a compressor that compresses hydrogen as the variable vessel is pressurized by a pressure medium, and an embrittlement blocking member is installed at a vessel cap in an overlapping state, whereby it is possible to prevent the occurrence of hydrogen brittleness due to penetration of hydrogen into the vessel cap.

It is another object of the present invention to provide a variable volume hydrogen container or hydrogen compressor with improved hydrogen embrittlement resistance configured such that an external pressure action recess is formed between the vessel cap and the embrittlement blocking member, and external pressure is applied to the external pressure action recess through a transmitted hydrogen discharge hole, whereby it is possible to directly discharge hydrogen that has been transmitted through the embrittlement blocking member to the outside through the transmitted hydrogen discharge hole, and therefore it is possible to prevent hydrogen embrittlement from occurring in the vessel cap.

It is a further object of the present invention to provide a variable volume hydrogen container or hydrogen compressor with improved hydrogen embrittlement resistance configured such that the embrittlement blocking member installed at the vessel cap in order to block hydrogen embrittlement is made of any of various materials, whereby it is possible to reduce production costs, and the vessel cap is made of a material that has higher durability than a material having hydrogen embrittlement resistance, whereby it is possible to improve durability.

In accordance with the present invention, the above and other objects can be accomplished by the provision of a variable volume hydrogen container or hydrogen compressor with improved hydrogen embrittlement resistance, the variable volume hydrogen container or hydrogen compressor including a variable vessel configured to expand due to hydrogen filling and to compress or discharge the hydrogen stored therein by hydrogen filling while contracting, a pressure vessel configured to receive the variable vessel, at least one of opposite ends of the pressure vessel being open, a vessel wire wound around the pressure vessel in a radial direction, the vessel wire being configured to increase rigidity of the pressure vessel, a vessel cap configured to seal the at least one open end of the pressure vessel, a vessel frame configured to support a vessel assembly constituted by the vessel cap and the pressure vessel while wrapping the circumference of the vessel assembly to prevent separation of the vessel cap from the pressure vessel, a frame wire wound around the circumference of the vessel frame, the frame wire being configured to increase rigidity of the vessel frame, an embrittlement blocking member disposed so as to overlap the vessel cap, the blocking embrittlement member being configured to block hydrogen from penetrating into the vessel cap due to internal pressure of the variable vessel or the pressure vessel, and a transmitted hydrogen discharge hole configured to discharge hydrogen that has been transmitted through the embrittlement blocking member to an outside before being introduced into the vessel cap.

The variable volume hydrogen container or hydrogen compressor may include an external pressure action recess formed between the vessel cap and the embrittlement blocking member, wherein external pressure may be applied to the external pressure action recess through the transmitted hydrogen discharge hole.

The external pressure action recess may be formed in the vessel cap or the embrittlement blocking member so as to have an uneven shape.

The embrittlement blocking member may be made of a material having hydrogen embrittlement resistance or may be coated with a material having hydrogen embrittlement resistance, and the vessel cap may be made of a material having no hydrogen embrittlement resistance.

The embrittlement blocking member may have a thickness equivalent to ⅓ or less of the thickest part of the vessel cap.

The embrittlement blocking member may include a blocking member seal installed on an edge of the embrittlement blocking member, the blocking member seal being configured to prevent leakage of hydrogen between the pressure vessel or the variable vessel and the embrittlement blocking member.

The vessel cap may include a cap seal configured to form a seal between the vessel cap and the pressure vessel to prevent leakage of hydrogen.

The variable volume hydrogen container or hydrogen compressor may include a filling nozzle installed through the vessel cap and the embrittlement blocking member, the filling nozzle being configured to supply hydrogen into the variable vessel such that the variable vessel is filled with the hydrogen.

The vessel cap or the pressure vessel may include a compression core portion inserted into the variable vessel such that the hydrogen in the variable vessel is pressurized when the variable vessel contracts, and the embrittlement blocking member may be installed so as to wrap the circumference of the compression core portion.

The vessel frame may include yoke frame portions located outside the vessel caps, the yoke frame portions being configured to support the vessel caps, each of the yoke frame portions having a outwardly convex curved surface including a semicircle, and side frame portions located at opposite ends of the yoke frame portions such that the pressure vessel is located therebetween, the side frame portions being configured to support the yoke frame portions.

The variable vessel may be configured by stacking a plurality of ring-shaped plates and joining the plurality of ring-shaped plates in a bellows form.

The variable volume hydrogen container or hydrogen compressor may include a pressure medium configured to be supplied between the variable vessel and the pressure vessel, wherein the pressure medium may pressurize the variable vessel such that the hydrogen in the variable vessel is compressed or discharged.

The vessel frame may include a support configured to support the vessel assembly on the floor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
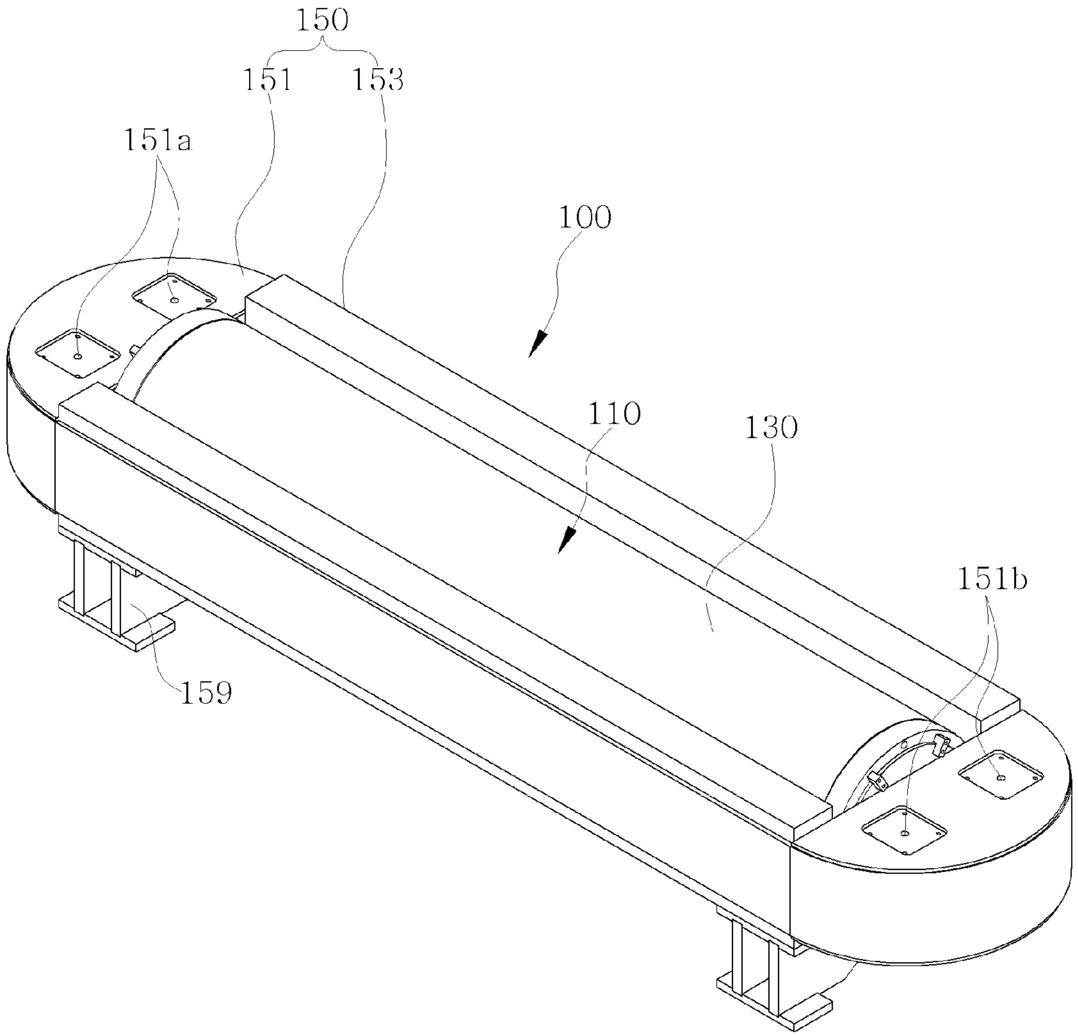
FIG. 1 is a perspective view of a variable volume hydrogen container or hydrogen compressor with improved hydrogen embrittlement resistance according to an embodiment of the present invention.
Figure 2:
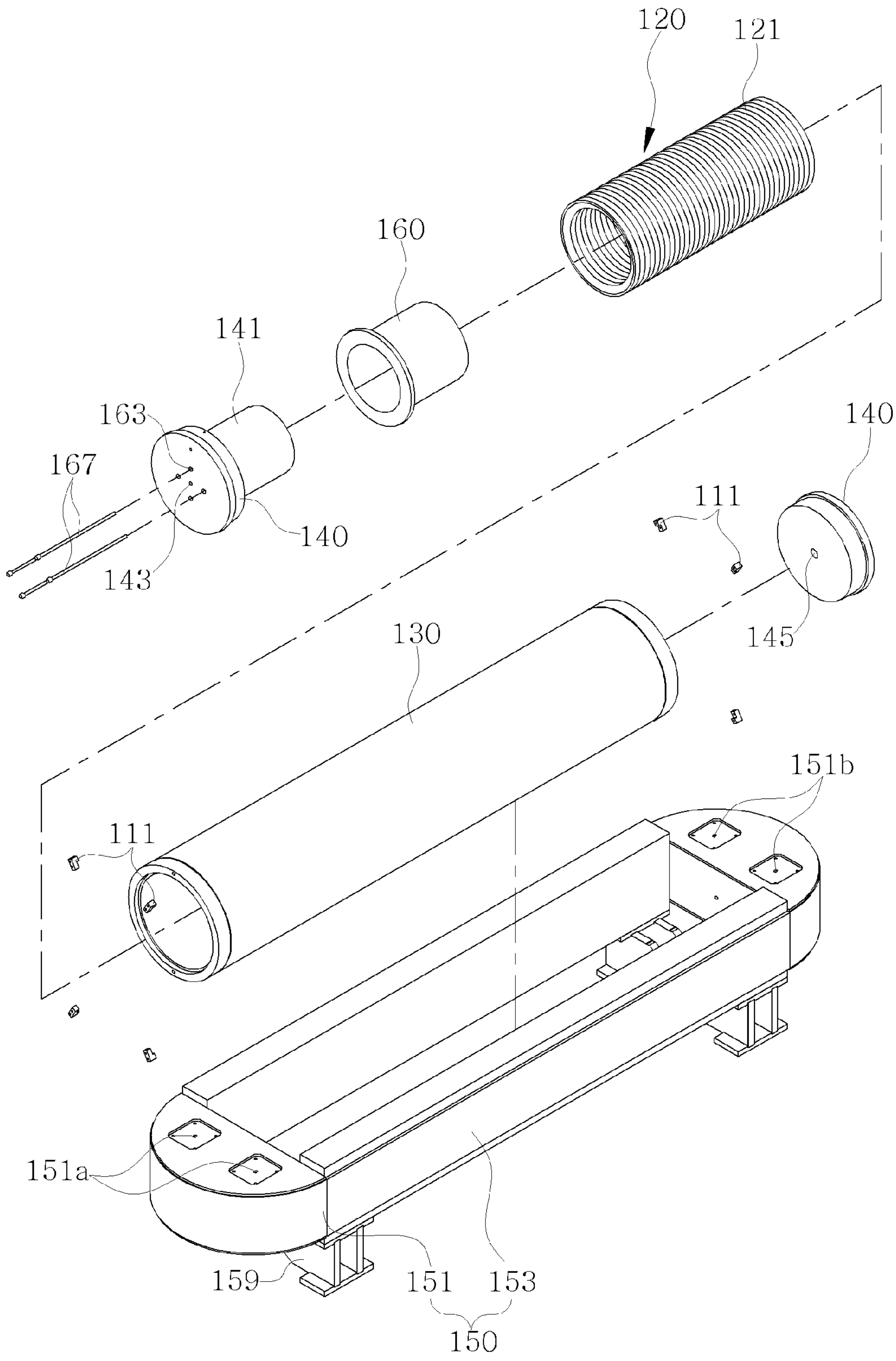
FIG. 2 is an exploded perspective view of the variable volume hydrogen container or hydrogen compressor with improved hydrogen embrittlement resistance according to the embodiment of the present invention.
Figure 3:
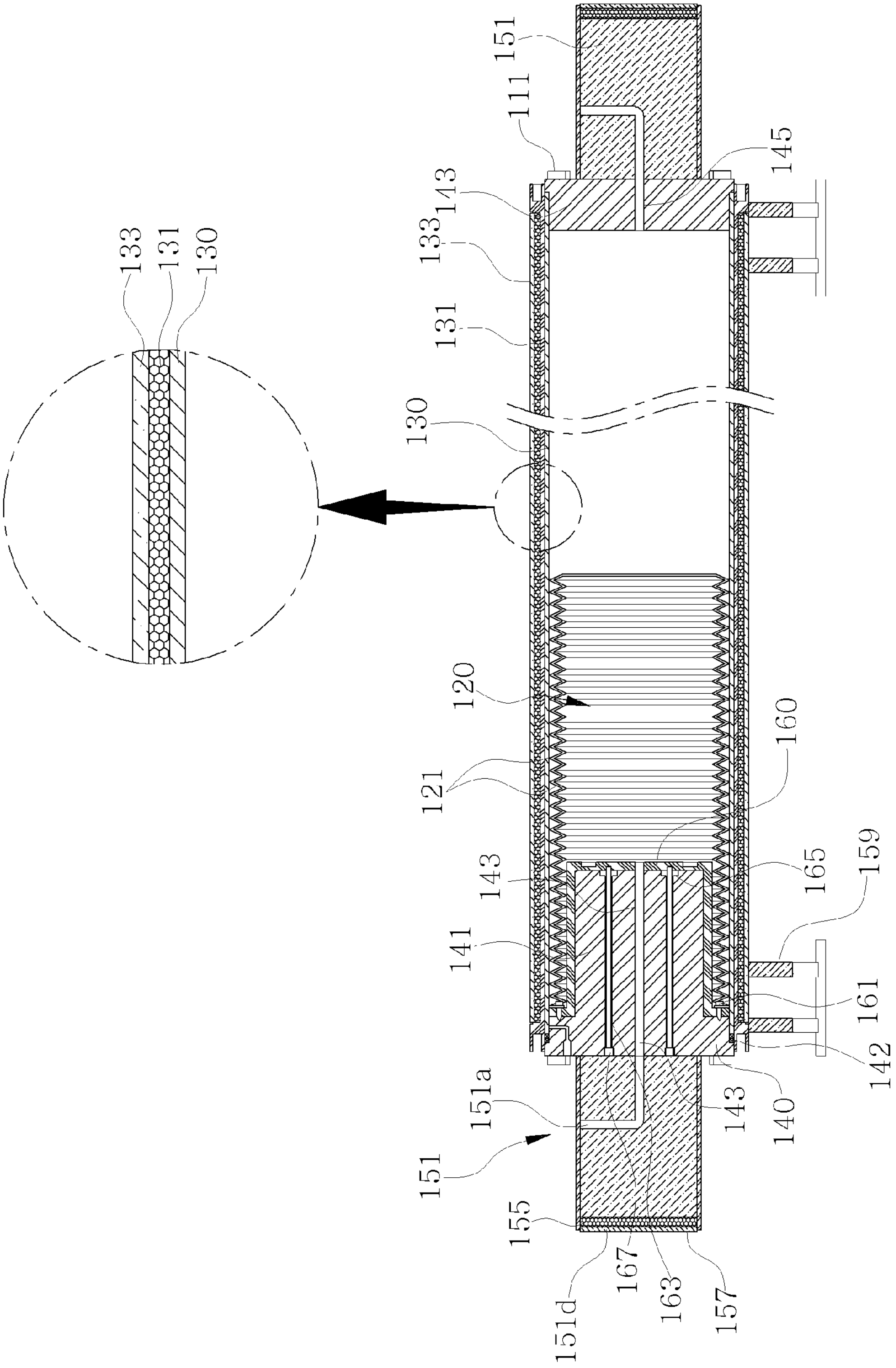
FIG. 3 is a side view of the variable volume hydrogen container or hydrogen compressor with improved hydrogen embrittlement resistance according to the embodiment of the present invention, showing the state in which a variable vessel contracts.

Hereinafter, an embodiment of the present invention will be described with reference to the accompanying drawings.

As shown in FIGS. 1 to 4, a variable volume hydrogen container or hydrogen compressor 100 with improved hydrogen embrittlement resistance according to an embodiment of the present invention may include a vessel assembly 110.

The vessel assembly 110 may be filled with hydrogen and compress the hydrogen, may pressurize and discharge the hydrogen, or may store and keep the hydrogen.

The vessel assembly 110 may include a variable vessel 120.

The variable vessel 120 may be filled with hydrogen and may expand and contract depending on the amount of hydrogen with which the variable vessel is filled, whereby the volume of the variable vessel may change.

The variable vessel 120 may expand and contract in the form of a bellows that is open at one end and closed at the other end, and the variable vessel 120 may be configured in the form of a bellows by stacking a plurality of ring-shaped plates 121 and alternately joining the inner and outer circumferences of adjacent ring-shaped plates 121.

In this case, each of the plurality of ring-shaped plates 121 may be coated with a material having hydrogen embrittlement resistance, may be treated to prevent hydrogen embrittlement, or may be made of a material having hydrogen embrittlement resistance, whereby it is possible to prevent damage to the ring-shaped plates due to embrittlement by hydrogen with which the variable vessel is filled.

Here, the material having hydrogen embrittlement resistance may be a metal, such as aluminum, titanium, carbon, stainless steel, austenite, martensite, or a family metal thereof, or may be a non-metal.

Meanwhile, each of the plurality of ring-shaped plates 121 may be formed in the form of a thin plate such that the part of the ring-shaped plate between the inner and outer circumferences thereof can be elastically deformed when the variable vessel 120 contracts and expands, and each of the plurality of ring-shaped plates 121 may have a wavy corrugated shape between the inner and outer circumferences thereof so as to be easily elastically deformed.

The variable vessel 120 expands and contracts. When the variable vessel 120 contracts, hydrogen in the variable vessel may be compressed or discharged. When the variable vessel 120 expands, hydrogen may be suctioned into the variable vessel 120.

In this case, contraction and expansion of the variable vessel 120 may be performed by a pressure medium, a description of which will follow, and the variable vessel 120 expands and contracts in response to the volume of hydrogen with which the variable vessel is filled, whereby it is possible to fill the variable vessel with hydrogen and to discharge hydrogen from the variable vessel at an even pressure.

The vessel assembly 110 may include a pressure vessel 130.

The pressure vessel 130 may be formed in the shape of a hollow container, and the pressure vessel 130 may be formed in the shape of a cylinder that is open at opposite sides.

The pressure vessel 130 may be made of a material having hydrogen embrittlement resistance, the interior of the pressure vessel 130 may be coated with a material having hydrogen embrittlement resistance, or an embrittlement-resistant container made of a material having hydrogen embrittlement resistance may be installed on the interior circumference of the pressure vessel 130 in tight contact therewith.

The pressure vessel 130 may have a predetermined thickness to withstand high or ultra-high pressures. At the open opposite ends of the pressure vessel 130, a vessel flange configured to prevent separation of a vessel wire 131, a description of which will follow, may be formed along the circumference of each of the opposite ends of the pressure vessel 130.

The vessel assembly 110 may include a vessel wire 131.

The vessel wire 131 may be continuously wound around the circumference of the pressure vessel 130 from one side to the outer side of the pressure vessel to improve endurance of the pressure vessel 130.

For example, the vessel wire 131 may be wound around the circumference of the pressure vessel 130 in a spiral form from one side to the other side of the pressure vessel 130, and may then be wound around the circumference of the pressure vessel from the other side to the one side of the pressure vessel 130 in a spiral form, which may be repeated several times such that the vessel wire is wound around the circumference of the pressure vessel 130 so as to have a plurality of layers.

Of course, the vessel wire 131 is wound between the vessel flanges located at the opposite sides of the pressure vessel 130.

A ferrous metal wire, such as a piano wire, which has high rigidity, or a non-ferrous metal wire, which has high corrosion resistance, may be used as the vessel wire 131.

Here, winding the vessel wire 131 around the pressure vessel 130 ensures that, even if the pressure of hydrogen in the pressure vessel 130 exceeds an allowable pressure, the pressure vessel 130 will only crack, whereby the hydrogen leaks, but the pressure vessel 130 will not explode.

A vessel cover 133 configured to cover the vessel wire 131 in the state in which the vessel wire 131 is wound around the pressure vessel 130 may be further installed on the pressure vessel 130.

The vessel assembly 110 may include a vessel cap 140.

The vessel cap 140 may be installed on each of the open opposite ends of the pressure vessel 130 to seal the open end of the pressure vessel 130.

A cap seal 142 configured to form a seal may be installed between the vessel cap 140 and the pressure vessel 130, and any of various known types of high-pressure seals each having a structure having adhesion increased by resisting pressure that can withstand high or ultra-high pressures may be used as the cap seal 142.

The cap seal 142 may be inserted into a seal groove formed around the circumference of the vessel cap 140 in the form of a ring so as to be installed therein. The cap seal 142 may be made of metal in order to withstand high pressure, and the cap seal 142 may be made of a material having hydrogen embrittlement resistance in order to prevent hydrogen embrittlement.

The vessel cap 140 located at the open part of the variable vessel 120, which is one of the vessel caps 140 located at the opposite sides of the pressure vessel 130, may be provided with a compression core portion 141 configured to be inserted into the vessel cap 140.

The compression core portion 141 is inserted into the open part of the variable vessel 120 and occupies the internal space of the variable vessel 120 when the variable vessel 120 maximally contracts. When the variable vessel 120 contacts, therefore, all hydrogen in the variable vessel 120 may be discharged or compressed.

A hydrogen filling and releasing port **151*a* configured to allow the variable vessel 120 to be filled with hydrogen therethrough or to allow hydrogen to be discharged from the variable vessel 120 therethrough may be formed through the vessel cap 140 having the compression core portion 141 formed thereon. The hydrogen filling and releasing port 151*a* may be constituted by a hydrogen filling port for hydrogen filling and a hydrogen releasing port for hydrogen releasing, or the variable vessel may be filled with hydrogen or hydrogen may be discharged from the variable vessel through a single hydrogen filling and releasing port 151*a***, as in the embodiment.

On the other hand, a medium filling and releasing port **151*b* configured to supply a pressure medium such that the variable vessel 120 is contracted by the pressure medium may be formed through the vessel cap 140 located at the part of the variable vessel 120 opposite the open part of the variable vessel 120, which is the other of the vessel caps 140 located at the opposite sides of the pressure vessel 130**.

The medium filling and releasing port 151*b* may be constituted by a filling port for pressure medium filling and a releasing port for pressure medium releasing, or the pressure medium may be supplied to the pressure vessel 130 or may be discharged from the pressure vessel 130 through a single medium filling and releasing port 151*b*, as in the embodiment.

Although the medium filling and releasing port 151*b* is described as being formed in the vessel cap 140 in the embodiment, the medium filling and releasing port 151*b* may be formed in the pressure vessel 130.

A cap flange is formed around the circumference of the vessel cap 140. When coupled to the pressure vessel 130, the cap flange may be installed on the pressure vessel 130 such that the cap flange overlaps each end of the pressure vessel 130.

The vessel cap 140 may be removably coupled to the pressure vessel 130. The vessel cap 140 may be pressed by a cap fixing jig 111, whereby the vessel cap 140 may be fixed to the pressure vessel 130. When the cap fixing jig 111 is removed, the vessel cap 140 may be separated from the pressure vessel 130.

The cap fixing jig 111 may be formed in the shape of a block and fixed to the circumference of the pressure vessel 130 by a bolt. The cap fixing jig 111 may overlap the pressure vessel 130 and the vessel cap 140 therebetween to fix the vessel cap 140 to the pressure vessel 130. A plurality of cap fixing jigs 111 may be arranged radially about the center of the pressure vessel 130.

Of course, the vessel cap 140 may be coupled to the pressure vessel 130 by screw fastening without the cap fixing jig 111.

As shown in FIGS. 1 to 4, the variable volume hydrogen container or hydrogen compressor 100 with improved hydrogen embrittlement resistance according to the embodiment of the present invention may include a vessel frame 150.

The vessel frame 150 may wrap around the circumference of the vessel assembly 110 to securely support the vessel cap 140, thereby preventing the vessel cap 140 from being separated from the pressure vessel 130 by internal pressure.

The vessel frame 150 may be formed in the shape of a rectangular frame with a perforated center, and the vessel assembly 110 may be inserted into the perforated center of the vessel frame 150 to securely support the vessel cap 140 at the pressure vessel 130 in such a manner that the vessel cap 140 is compressed on each side.

The vessel frame 150 may include yoke frame portions 151 and side frame portions 153.

The yoke frame portions 151 are located outside the vessel caps 140 that seal the opposite sides of the pressure vessel 130 to prevent the vessel caps 140 from being separated from the pressure vessel 130.

Each yoke frame portion 151 may have a semicircular curved surface convex formed in a direction toward the outside of a corresponding one of the vessel caps 140.

A yoke cover 151*d* configured to externally cover a frame wire 155 wound via the yoke frame portion 151 may be installed on the yoke frame portion 151, and a yoke wire groove, in which the frame wire 155 is wound, may be formed on the outer periphery of the yoke frame portion 151.

The side frame portions 153 may be located at opposite sides of the pressure vessel 130 in a circumferential direction in the state in which the pressure vessel 130 is disposed therebetween, and may be installed in a form that connect the yoke frame portions 151, which support the vessel caps 140 on the opposite sides of the pressure vessel 130, to each other.

The side frame portion 153 is formed so as to have a length corresponding to the length of the pressure vessel 130 such that the yoke frame portion 151, which supports the vessel cap 140 sealing the pressure vessel 130, is connected to the vessel cap 140 in tight contact therewith.

A wire winding groove in which a frame wire 155, a description of which will follow, is wound may be formed in the outside of each of the vessel frame 150 located on either side of the pressure vessel 130.

Meanwhile, the yoke frame portion 151 where the vessel cap 140 having the compression core portion 141, which is located in the pressure vessel 130, formed thereon is located, may be provided with a hydrogen inlet and outlet port 143 configured to communicate with the hydrogen filling and releasing port 151*a* formed in the vessel cap 140 to fill the vessel assembly 110 with hydrogen or to discharge hydrogen from the vessel assembly.

A hydrogen control valve configured to control the inflow and outflow of hydrogen may be installed in the hydrogen inlet and outlet port 143 or the hydrogen filling and releasing port 151*a*. When the variable vessel 120 is compressed in the state in which the hydrogen inlet and outlet port 143 or the hydrogen filling and releasing port 151*a* is closed, the stored hydrogen may be compressed. When the variable vessel 120 is compressed in the state in which the hydrogen inlet and outlet port 143 or the hydrogen filling and releasing port 151*a* is open, the stored hydrogen may be discharged.

Here, when the variable vessel 120 is compressed by the pressure medium in the state in which the discharge of hydrogen is blocked by the hydrogen control valve, hydrogen may be compressed. In the state in which the discharge of hydrogen is allowed by the hydrogen control valve, the hydrogen in the variable vessel 120 may be discharged to the outside.

When hydrogen is compressed and the compressed hydrogen is discharged under the control of the hydrogen control valve, the variable vessel may be used as a hydrogen compressor. When hydrogen is stored in the variable vessel 120 by filling and the hydrogen in the variable vessel is discharged while being pressurized, the variable vessel may be used as a hydrogen container.

On the other hand, the yoke frame portion 151 where the vessel cap 140 without the compression core portion 141 is located may be provided with a medium inlet and outlet port 145 configured to communicate with the medium filling and releasing port 151*b* formed in the vessel cap 140 to supply a pressure medium to the vessel assembly 110 or to discharge the pressure medium from the vessel assembly 110.

Here, the medium filling and releasing port 151*b* may be located to face the blocked portion of the variable vessel 120 such that the pressure medium injected into the pressure vessel 130 can pressurize the variable vessel 120 in a contraction direction.

The medium inlet and outlet port 145 may be constituted by a supply port configured to allow the pressure medium to be supplied to the vessel assembly 110 therethrough and a discharge outlet configured to allow the pressure medium to be discharged from the vessel assembly 110 therethrough, or the supply and discharge of the pressure medium may be performed through a single medium inlet and outlet port 145.

The vessel frame 150 may include a frame wire 155.

The frame wire 155 may increase the rigidity of the vessel frame 150, and the frame wire 155 may be installed around the entire circumference of the vessel frame 150 so as to have a plurality of layers.

For example, the frame wire 155 may sequentially extend along one yoke frame portion 151, the side frame portion 153 located on one side, the other yoke frame portion 151, and the side frame portion 153 located on the other side, which is repeated such that frame wire is wound around the entirety of the vessel frame 150.

A ferrous metal wire, such as a piano wire, which has high rigidity, or a non-ferrous metal wire, which has high corrosion resistance, to prevent corrosion may be used as the frame wire 155.

A frame cover 157 configured to cover the frame wire 155 to prevent the frame wire 155 from being exposed to the outside may be installed around the circumference of the vessel frame 150 in the state in which the frame wire 155 is wound around the vessel frame 150 so as to cover the outer circumference of the vessel frame 150.

The vessel frame 150 may include a support 159.

The support 159 may support the vessel frame 150 in a state of being spaced apart from the floor such that the hydrogen container or hydrogen compressor 100 is installed on the floor or a plurality of hydrogen containers or hydrogen compressors is installed on the floor in a stacked state.

A plurality of supports 159 may be installed on the vessel frame 150, and the support 159 may fix the hydrogen vessel or hydrogen compressor 100 in an upright state, or may fix the hydrogen vessel or hydrogen compressor 100 in a horizontally lying state, as in the embodiment.

Figure 4:
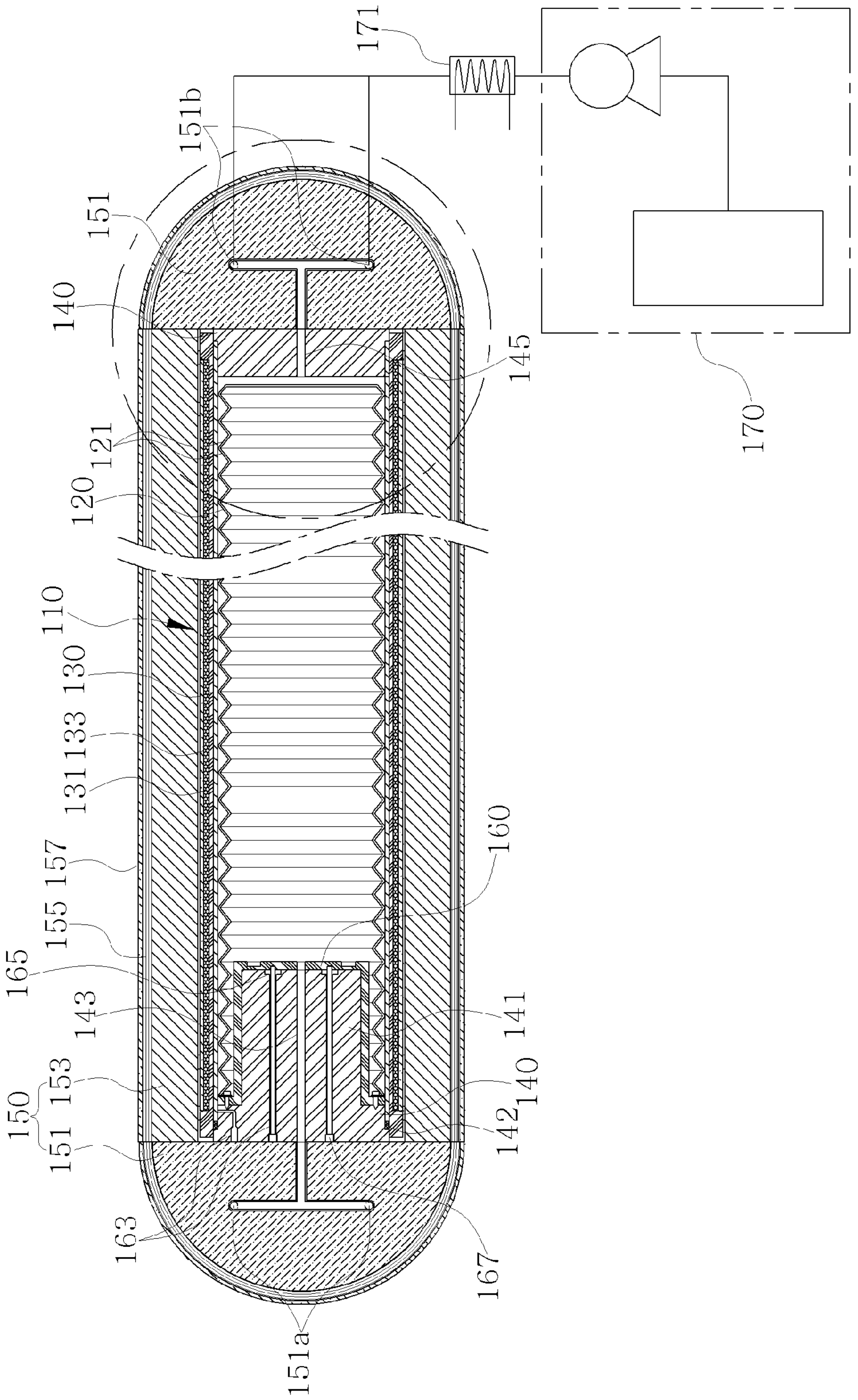
FIG. 4 is a plan sectional view of the variable volume hydrogen container or hydrogen compressor with improved hydrogen embrittlement resistance according to the embodiment of the present invention, showing the state in which the variable vessel expands.
Figure 5:
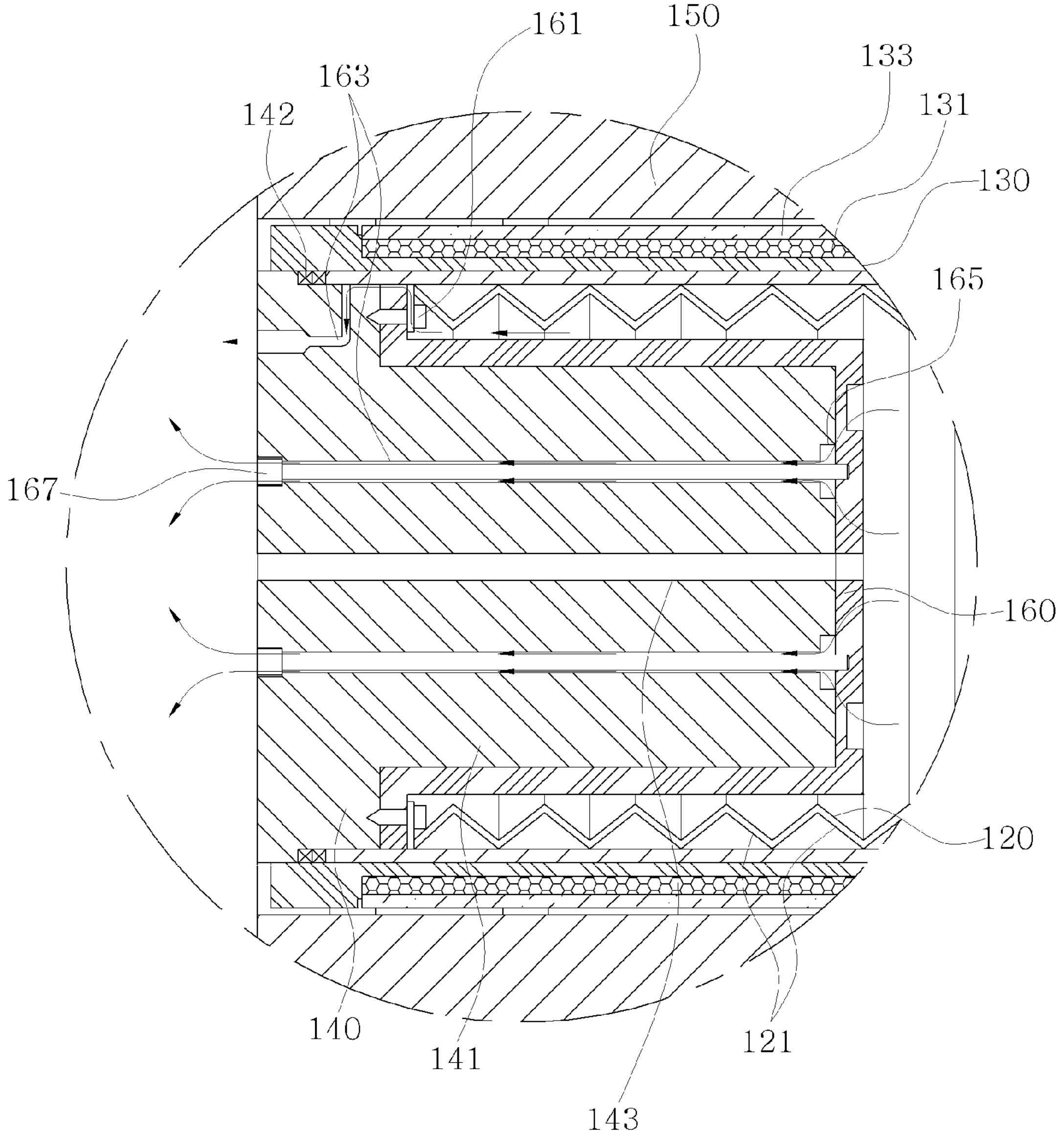
FIG. 5 is an enlarged sectional view of a vessel cap in which an embrittlement blocking member constituting the variable volume hydrogen container or hydrogen compressor with improved hydrogen embrittlement resistance according to the embodiment of the present invention is installed.

As shown in FIG. 4, the variable volume hydrogen container or hydrogen compressor 100 with improved hydrogen embrittlement resistance according to the embodiment of the present invention may include a medium supply device 170.

The medium supply device 170 may inject a pressure medium into the pressure vessel 130 to provide a pressurizing force to compress or evacuate the variable vessel 120.

The pressure medium can be a fluid, such as water or oil, a gas, such as an inert gas, a gas having a similar compression ratio to hydrogen, or hydrogen.

The pressure medium may be injected between the variable vessel 120 and the pressure vessel 130 to reduce the pressure difference in the pressure vessel 130 due to filling of the variable vessel 120 with hydrogen, thereby preventing damage to the variable vessel 120, and to provide a compression force to forcefully compress the expanded variable vessel 120.

The pressure medium may be supplied to the interior of the vessel assembly 110 at a pressure higher than the pressure of the hydrogen in the variable vessel 120 through the medium filling and releasing port 151*b* of the vessel assembly 110 or the medium inlet and outlet port 145 formed in the yoke frame portion 151 to compress the hydrogen in the variable vessel 120 in the form of forcibly pressurizing the variable vessel 120, or to forcibly discharge the hydrogen from the variable vessel.

The pressure medium may lower the temperature of hydrogen for filling depending on the temperature of the pressure medium, thereby increasing the amount of hydrogen for filling.

When hydrogen is discharged by pressurizing the variable vessel 120 using the pressure medium, the hydrogen in the variable vessel 120 may be discharged uniformly at a constant pressure without any change in pressure until all of the hydrogen is discharged.

When the variable vessel 120 is filled with hydrogen in the state in which the variable vessel 120 is compressed, the pressure medium in the pressure vessel 130 may be discharged from the pressure vessel 130 through the medium inlet and outlet port 145 or the medium filling and releasing port 151*b* as the variable vessel 120 expands.

The media supply device 170 may further include a cooler 171 configured to reduce the temperature of the pressure medium.

Since the cooler 171 reduces the temperature of the pressure medium and supplies the pressure medium to the interior of the pressure vessel 130, it is possible to prevent the hydrogen in the vessel assembly 110 from expanding due to temperature and to perform a heat preservation function for the hydrogen.

A medium control valve configured to control the discharge of the pressure medium may be installed in the medium filling and releasing port 151*b* or the medium inlet and outlet port 145, and the pressure of hydrogen supplied in the variable vessel 120 by filling may be adjusted by adjusting the discharge pressure of the pressure medium according to the degree of opening of the medium control valve.

For example, when the degree of opening of the medium control valve is small, the pressure medium is relatively resistant to evacuation, whereby it is possible to increase the pressure of hydrogen supplied to the variable vessel 120 by filling.

When the medium inlet and outlet port 145 is constituted by a medium inlet port and a medium outlet port, the medium control valve may be constituted by a medium introduction valve configured to control the introduction of the pressure medium and a medium discharge valve configured to control the discharge of the pressure medium.

As shown in FIGS. 2 to 5, the variable volume hydrogen container or hydrogen compressor 100 with improved hydrogen embrittlement resistance according to the embodiment of the present invention may include an embrittlement blocking member.

The embrittlement blocking member 160 may be coupled to the vessel cap 140 to block hydrogen embrittlement of the vessel cap 140 in contact with hydrogen.

The embrittlement blocking member 160 may be installed at the vessel cap 140 that seals the open part of the variable vessel 120. The embrittlement blocking member 160 may be installed at the surface of the variable vessel 120 of the compression core portion 141, which is inserted into the open part of the vessel cap 140, located at the innermost side of the variable vessel 120 in an overlapping fashion, or may be installed in a form that completely covers the compression core portion 141.

Here, since the compression core portion 141 of the vessel cap 140 has a relatively large thickness, hydrogen that is transmitted may stay on the compression core portion 141, whereby it is possible to prevent damage to the vessel cap 140 due to hydrogen embrittlement.

In the embodiment, the embrittlement blocking member 160 is shown as being installed only on the vessel cap 140 having the compression core portion 141 formed thereon, which is one of the vessel caps 140 installed on the opposite sides of the pressure vessel 130; however, the embrittlement blocking member 160 may also be installed on the vessel cap 140 having no compression core portion 141 formed thereon.

The embrittlement blocking member 160 may function to block the transmission of hydrogen through the vessel cap

140, and may also function to relieve pressure applied to the vessel cap 140 when compressing, or discharging hydrogen.

For example, since atmospheric pressure acts between the vessel cap 140 and the embrittlement blocking member 160 through a transmitted hydrogen discharge hole 163 and hydrogen pressure, which is relatively high, acts in the variable vessel 120, the embrittlement blocking member 160 may function to block the hydrogen pressure acting on the vessel cap 140 side.

Meanwhile, a transmitted hydrogen discharge hole 163, through which external atmospheric pressure acts to discharge hydrogen that has been transmitted through the embrittlement blocking member 160 to the outside, may be formed through the vessel cap 140.

The transmitted hydrogen discharge hole 163 is formed through the vessel cap 140 from the outside to the region between the embrittlement blocking member 160 and the vessel cap 140, whereby hydrogen that has been transmitted through the embrittlement blocking member 160 does not enter the vessel cap 140 and is exhausted to the outside through the transmitted hydrogen discharge hole 163, and therefore it is possible to prevent hydrogen from penetrating into the vessel cap 140 and causing hydrogen embrittlement.

The transmitted hydrogen discharge hole 163 may also be implemented as a fastening member hole formed through the vessel cap 140 such that a fastening member 167, such as a bolt, configured to couple the embrittlement blocking member 160 to the vessel cap 140 is inserted through the fastening member hole in the state in which the embrittlement blocking member 160 is disposed so as to overlap the vessel cap 140.

The transmitted hydrogen discharge hole 163 may be formed to communicate with the outside through the vessel cap 140 between the vessel cap 140 and the inner circumference of the pressure vessel 130 as well as at the position where the vessel cap 140 and the embrittlement blocking member 160 face each other.

In this case, hydrogen that has been transmitted through the embrittlement blocking member 160 may move between the vessel cap 140 and the inner circumference of the pressure vessel 130 through the gap between the vessel cap 140 and the embrittlement blocking member 160, and may be discharged to the outside through the transmitted hydrogen discharge hole 163.

A pressure ball valve configured to adjust the degree of opening of the transmitted hydrogen discharge hole 163 may be installed in the transmitted hydrogen discharge hole 163. Since the amount of hydrogen discharged through the transmitted hydrogen discharge hole 163 is insignificant, the hydrogen may be discarded to the outside, may be filtered by a catalyst carrier filter such that discharge of the hydrogen to the outside is blocked, or may be stored in a separate storage container.

The embrittlement blocking member 160 may be made of a material having hydrogen embrittlement resistance, or the surface of the embrittlement blocking member in contact with hydrogen may be coated with a material having hydrogen embrittlement resistance to form a hydrogen embrittlement resistance coating layer thereon.

The embrittlement blocking member 160 may have a thickness equivalent to ⅓ or less of the thickest part of the vessel cap 140.

If the thickness of the embrittlement blocking member 160 exceeds ⅓ of the thickness of the vessel cap 140, hydrogen is not transmitted through the embrittlement blocking member 160 and remains in the embrittlement blocking member 160, whereby hydrogen embrittlement may occur. In addition, the volume of the embrittlement blocking member 160 is relatively large, whereby the volume of the variable vessel 120 that is filled with hydrogen is decreased.

On the other hand, if the embrittlement blocking member 160 is formed so as to have a thickness equivalent to ⅓ or less of the thickness of the vessel cap 140, hydrogen is transmitted through the embrittlement blocking member 160 without staying in the embrittlement blocking member 160 due to high pressure in the variable vessel 120, and the volume of the variable vessel 120 occupied by the embrittlement blocking member 160 may be reduced, whereby it is possible to store a relatively large amount of hydrogen.

An external pressure action recess 165 may be formed in the surface of the vessel cap 140 to which the embrittlement blocking member 160 is coupled, and external pressure may be applied between the vessel cap 140 and the embrittlement blocking member 160 to induce the discharge of hydrogen.

Since the external pressure action recess 165 is located at the interface between the vessel cap 140 and the embrittlement blocking member 160, external atmospheric pressure may be applied to the external pressure action recess 165 through the gap at the interface between the vessel cap 140 and the embrittlement blocking member 160 via the transmitted hydrogen discharge hole 163.

The inner surface of the external pressure action recess 165 may be coated with a material having hydrogen embrittlement resistance to prevent hydrogen introduced into the external pressure action recess 165 from penetrating into the interior of the vessel cap 140, or an embrittlement prevention recess cover (not shown) having a shape corresponding to the shape of the external pressure action recess 165 and made of a material having hydrogen embrittlement resistance may be fitted into the inside of the external pressure action recess 165.

The external pressure action recess 165 may be formed in at least one of the surface of the vessel cap 140 that faces the embrittlement blocking member 160 and the surface of the embrittlement blocking member 160 that faces the vessel cap 140 in the shape of a flow channel, or may be formed in the vessel cap 140 so as to have an arbitrary shape.

In another example, the external pressure action recess 165 may be formed in at least one of the surface of the vessel cap 140 that faces the embrittlement blocking member 160 and the surface of the embrittlement blocking member 160 that faces the vessel cap 140 so as to have a regular or irregular uneven surface.

The embrittlement blocking member 160 may include a blocking member seal 161.

The blocking member seal 161 may be installed around the circumference of the embrittlement blocking member 160 to prevent stored hydrogen from leaking between the circumference of the embrittlement blocking member 160 and the pressure vessel 130 or between the circumference of the embrittlement blocking member 160 and the variable vessel 120.

The blocking member seal 161 may be formed in the shape of a ring. The blocking member seal 161 may be made of a material having hydrogen embrittlement resistance, or may be coated with a material having hydrogen embrittlement resistance. Any of various known types of high-pressure seals capable of withstanding high pressure of hydrogen may be used as the blocking member seal 161.

The blocking member seal 161 may be installed around the circumference of the surface of the embrittlement blocking member 160 that faces hydrogen to prevent leakage of hydrogen. Meanwhile, since the vessel cap 140 is protected against hydrogen embrittlement by the embrittlement blocking member 160, a description of which will follow, the vessel cap may be made of a material having no hydrogen embrittlement resistance and may be made of a material that has higher strength than a material having hydrogen embrittlement resistance, whereby it is possible to improve durability and to reduce production costs.

Hereinafter, the interaction and effects of the components will be described.

In the variable volume hydrogen container or hydrogen compressor 100 with improved hydrogen embrittlement resistance according to the embodiment of the present invention, the vessel assembly 110 may be filled with hydrogen, and the hydrogen may be compressed in the vessel assembly 110 or may be discharged from the vessel assembly 110.

The vessel assembly 110 is configured such that the variable vessel 120, the volume of which is variable, is inserted into the pressure vessel 130 and opposite ends of the pressure vessel 130 are sealed by the respective vessel caps 140.

The variable vessel 120 may be configured in the form of a bellows by stacking a plurality of ring-shaped plates 121 and alternately joining the inner and outer circumferences of the ring-shaped plates 121. One end of the variable vessel 120 is closed, and the other end of the variable vessel 120 is open.

The variable vessel 120 is inserted into the pressure vessel 130, the open opposite ends of the pressure vessel 130 are sealed by the vessel caps 140, and the vessel wire 131 is wound around the circumference of the pressure vessel 130 to increase the pressure resistance of the pressure vessel 130.

The vessel cap 140 is fixed and supported by a cap fixing jig 111 so as not to be easily separated from the pressure vessel 130, and the cap fixing jig 111 may be located at the part of the vessel frame 150 that is not supported by the yoke frame portion 151.

The vessel cap 140 located at the open part of the variable vessel 120, which is one of the vessel caps 140 that seal the opposite sides of the pressure vessel 130, is provided with a compression core portion 141, which is inserted into the vessel cap 140.

The vessel cap 140 located at the sealed part of the variable vessel 120 is provided with no compression core portion 141 and seals only the pressure vessel 130.

The vessel cap 140 is provided with an embrittlement the blocking member 160, which is installed to cover compression core portion 141 in the direction in which the compression core portion 141 faces the variable vessel 120 while wrapping the compression core portion 141.

A blocking member seal 161 configured to block the outflow of hydrogen between the variable vessel 120 or the pressure vessel 130 and the embrittlement blocking member 160 is installed at the part abutting the pressure vessel 130 between the embrittlement blocking member 160 and the variable vessel 120.

A transmitted hydrogen discharge hole 163, through which hydrogen that has been transmitted through the embrittlement blocking member 160 or hydrogen that has been transmitted through the embrittlement blocking member 160 to the circumference thereof in contact with the pressure vessel 130 is discharged to the outside without penetrating into the interior of the vessel cap 140, is formed through the vessel cap 140. The transmitted hydrogen discharge hole 163 may be implemented as a fastening member hole, through which a fastening member 167, such as a bolt, configured to fasten the vessel cap 140 therethrough in order to fix the vessel cap 140 and the embrittlement blocking member 160 is inserted.

An external pressure action recess 165 configured to collect hydrogen that has been transmitted through the embrittlement blocking member 160 and to discharge the collected hydrogen to the transmitted hydrogen discharge hole 163 may be formed in the parts of the vessel cap 140 and the embrittlement blocking member 160 that face each other.

The transmitted hydrogen discharge hole 163 is connected to the external pressure action recess 165, whereby external pressure is applied to discharge hydrogen that has been transmitted through the embrittlement blocking member 160 to the outside, and therefore hydrogen embrittlement of the vessel cap 140 is prevented.

Meanwhile, the vessel assembly 110 is fixed by the vessel frame 150 to prevent separation of the vessel cap 140 and to increase strength.

The vessel frame 150 includes yoke frame portions 151 and side frame portions 153.

The vessel caps 140 are supported by the yoke frame portions 151, each of which has an outwardly convex curved surface.

The yoke frame portions 151 located at opposite sides of the vessel assembly 110 are supported by the side frame portions 153. For example, the vessel assembly 110 is supported by the vessel frame 150, such as when the vessel assembly 110 is inserted into a rectangular vessel frame 150.

The vessel assembly 110 and the vessel frame 150 may be detachably coupled to each other via a detachment portion (not shown).

Here, when the vessel assembly 110 is configured to be detachable from the vessel frame 150 by the detachment portion, the vessel assembly 110 may be detached from the vessel frame 150 for inspection or replacement when the vessel frame 150 or the vessel assembly 110 is damaged or when performing an inspection of the vessel assembly 110 based on internal cracks.

Meanwhile, a medium supply device 170 is connected to one side of the vessel assembly 110. When a pressure medium is supplied from the medium supply device 170 to the interior of the pressure vessel 130, the variable vessel 120 is forcibly pressurized by the pressurization force of the pressure medium, whereby hydrogen is compressed or discharged.

At this time, the pressure medium is supplied to the interior of the pressure vessel 130 through the vessel cap 140 corresponding to the sealed part of the variable vessel 120 to pressurize the sealed part of the variable vessel 120.

A hydrogen control valve configured to control the discharge of hydrogen is installed in the hydrogen inlet and outlet port 143 or the hydrogen filling and releasing port 151*a*. When the pressure medium is continuously supplied in the state in which the hydrogen inlet and outlet port 143 or the hydrogen filling and releasing port 151*a* is closed by the hydrogen control valve, the variable vessel 120 is compressed, whereby the stored hydrogen may be compressed. When the pressure medium is supplied in the state in which the hydrogen inlet and outlet port 143 or the hydrogen filling and releasing port 151*a* is open by the hydrogen control valve, the variable vessel 120 is compressed, whereby the stored hydrogen may be discharged.

When the hydrogen inlet and outlet port 143 is constituted by a hydrogen inlet port and a hydrogen outlet port, the hydrogen control valve may be constituted by a hydrogen introduction valve configured to control the introduction of hydrogen and a hydrogen discharge valve configured to control the discharge of hydrogen.

Meanwhile, a cooler 171 may be installed in the medium supply device 170. The pressure medium may be cooled and supplied through the cooler 171 to reduce the temperature of the hydrogen in the variable vessel 120, whereby it is possible to prevent the volume of the hydrogen from expanding with temperature or to minimize the volume of the hydrogen, thereby increasing the amount of hydrogen for filling.

In the variable volume hydrogen container or hydrogen compressor 100 with improved hydrogen embrittlement resistance according to the embodiment of the present invention, as described above, when the pressure medium is supplied to the vessel assembly 110, hydrogen in the variable vessel 120 is compressed or discharged while the variable vessel 120 contracts, and when hydrogen is injected, the variable vessel 120 expands while the pressure medium is discharged from the vessel assembly 110.

At this time, the pressure of hydrogen stored in the variable vessel 120 by filling may be adjusted by controlling the discharge amount of the pressure medium supplied to the vessel assembly 110 by the medium control valve.

Meanwhile, when the hydrogen in the variable vessel 120 is discharged or compressed, the medium supply device 170 supplies a pressure medium to the vessel assembly 110.

When the pressure medium is supplied to the vessel assembly 110, the pressure medium pressurizes the variable vessel 120, and the stored hydrogen is discharged out of the vessel assembly 110 through the hydrogen filling and releasing port 151*a* and the hydrogen inlet and outlet port 143 by the pressure medium.

At this time, hydrogen may be compressed and discharged or may be directly discharged without being compressed depending on the degree of opening of the hydrogen control valve installed in the hydrogen filling and releasing port 151*a* or the hydrogen inlet and outlet port 143.

Although it is possible to discharge hydrogen in a compressed state or in an uncompressed state depending on the degree of opening of the hydrogen control valve, it is also possible to adjust the discharge rate of hydrogen according to the pressure at which the variable vessel 120 is pressurized by the pressure medium or the speed at which the pressure medium is supplied.

When the variable vessel 120 is pressurized by the pressure medium in the state in which the hydrogen discharge valve is closed, the hydrogen in the variable vessel 120 is compressed. When the hydrogen discharge valve is opened in the state in which the hydrogen is compressed, the compressed hydrogen may be discharged. Consequently, the variable vessel may be used as a hydrogen compressor.

Of course, when hydrogen is stored in the variable vessel 120 in a compressed state or in an uncompressed state, the variable vessel may be used as a hydrogen container.

When the hydrogen is discharged by pressurizing the variable vessel 120 using the pressure medium, the volume occupied by the hydrogen may be equalized in proportion to the remaining amount of hydrogen, whereby all of the stored hydrogen may be discharged at a constant pressure.

Meanwhile, when the variable vessel 120 contracts, the hydrogen is compressed, and the pressure of hydrogen applied to the compression core portion 141 located in the variable vessel 120 is increased, whereby the hydrogen may penetrate into the interior of the compression core portion 141. In the present invention, the embrittlement blocking member 160 is installed on the outer surface of the compression core portion 141, and therefore transmission of hydrogen through the compression core portion 141 is blocked.

The hydrogen transmitted through the embrittlement blocking member 160 moves to the external pressure action recess 165 through the gap between the embrittlement blocking member 160 and the vessel cap 140 due to the pressure of hydrogen stored in the variable vessel 120, and the hydrogen introduced into the external pressure action recess 165 is discharged to the outside through the transmitted hydrogen discharge hole 163.

Since the embrittlement blocking member 160 is installed at the vessel cap 140, as described above, the embrittlement blocking member 160 primarily prevents penetration of hydrogen into the vessel cap 140, and the hydrogen that has been transmitted through the embrittlement blocking member 160 is secondarily discharged to the outside through the transmitted hydrogen discharge hole 163, whereby it is possible to prevent hydrogen embrittlement of the vessel cap 140 due to penetration of hydrogen into the vessel cap 140.

Meanwhile, when cracks are formed in the vessel assembly 110, when regular inspection is necessary, or when separation for replacement is necessary due to damage to the vessel frame 150, the vessel assembly 110 may be separated from the vessel frame 150 through the detachment portion, and the vessel assembly 110 may be replaced or disassembled for inspection.

The supports 159 may be installed on the vessel frame 150 in order to fix the vessel assembly 110 in a vertically upright state or to fix the vessel assembly 110 in a horizontally lying state, and a plurality of hydrogen vessels or hydrogen compressors 100 may be installed in a stacked state.

In the variable volume hydrogen container or hydrogen compressor 100 with improved hydrogen embrittlement resistance according to the embodiment of the present invention, therefore, the variable vessel 120 is installed in the pressure vessel 130, and the volume of the variable vessel varies depending on the capacity of hydrogen stored in the variable vessel by filling, whereby it is possible to fill the variable vessel with hydrogen and to discharge hydrogen from the variable vessel at a uniform pressure. In addition, the variable vessel 120 is pressurized by the pressure medium to discharge hydrogen, and therefore it is possible to discharge all of the stored hydrogen at a uniform pressure.

In addition, the embrittlement blocking member 160 is installed at the part of the vessel cap 140 in contact with hydrogen to prevent the penetration of hydrogen into the vessel cap 140 through the embrittlement blocking member 160, whereby it is possible to prevent the occurrence of hydrogen embrittlement. Furthermore, since the hydrogen that has been transmitted through the embrittlement blocking member 160 is discharged to the outside through the transmitted hydrogen discharge hole 163 installed in the vessel cap 140, it is possible to prevent the occurrence of hydrogen embrittlement due to penetration of the hydrogen that has been transmitted through the embrittlement blocking member 160 into the vessel cap 140.

In addition, since it is possible to manufacture the vessel cap 140 using a material having no hydrogen embrittlement resistance due to the provision of the embrittlement blocking member 160, it is possible to reduce manufacturing costs. Furthermore, since it is possible to manufacture the vessel cap 140 using a material that has higher strength than a material having hydrogen embrittlement resistance, it is possible to improve durability.

In addition, the vessel assembly 110 is supported by the vessel frame 150, whereby durability of the vessel assembly 110 is improved, and the vessel wire 131 is wound around the pressure vessel 130 while the frame wire 155 is wound around the vessel frame 150, whereby durability is further improved. Consequently, it is possible to store hydrogen at high and ultra-high pressures and to prevent explosion of the vessel assembly 110 due to the pressure of hydrogen.

In addition, the vessel assembly 110 may be detachably coupled to the vessel frame 150 by the detachment portion, whereby it is possible to easily replace and inspect the vessel assembly 110.

In addition, the supports 159 are installed at the vessel frame 150, whereby a plurality of hydrogen containers or hydrogen compressors may be installed in a stacked state, and therefore it is possible to minimize an installation space.

As is apparent from the above description, according to the present invention, a variable vessel is installed in a pressure vessel, and the volume of the variable vessel is increased or decreased depending on the pressure of hydrogen with which the variable vessel is filled, whereby it is possible to perform hydrogen filling and hydrogen discharging or hydrogen compression at a uniform pressure, and an embrittlement blocking member is installed at a vessel cap formed so as to have a relatively large thickness, whereby it is possible to prevent the occurrence of hydrogen embrittlement in the vessel cap by the provision of the embrittlement blocking member.

In addition, according to the present invention, an external pressure action recess, to which external pressure is applied, is formed between the vessel cap and the embrittlement blocking member, and hydrogen that has been transmitted through the embrittlement blocking member is collected in the external pressure action recess and is then discharged to the outside through a transmitted hydrogen discharge hole, whereby it is possible to prevent the occurrence of hydrogen embrittlement in the vessel cap.

In addition, according to the present invention, since the embrittlement blocking member is installed at the vessel cap, the vessel cap may be made of any of various materials having no hydrogen embrittlement resistance, whereby it is possible to reduce the production cost, and the vesicle cap is made of a material having relatively high durability, whereby it is possible to improve durability.

Although the embodiment of the present invention has been described above, the scope of right of the present invention is not limited thereto and includes all alterations and modifications within a range easily changed and recognized as being equivalent by a person having ordinary skill in the art to which the present invention pertains from the embodiment of the present invention.

What is claimed is:

1. A variable volume hydrogen container or hydrogen compressor with improved hydrogen embrittlement resistance, the variable volume hydrogen container or hydrogen compressor comprising:

a variable vessel configured to expand due to hydrogen filling and to compress or discharge the hydrogen stored therein by hydrogen filling while contracting;

a pressure vessel configured to receive the variable vessel, at least one of opposite ends of the pressure vessel being open;

a vessel wire wound around the pressure vessel in a radial direction, the vessel wire being configured to increase rigidity of the pressure vessel;

a vessel cap configured to seal the at least one open end of the pressure vessel;

a vessel frame configured to support a vessel assembly constituted by the vessel cap and the pressure vessel while wrapping a circumference of the vessel assembly to prevent separation of the vessel cap from the pressure vessel;

a frame wire wound around a circumference of the vessel frame, the frame wire being configured to increase rigidity of the vessel frame;

an embrittlement blocking member disposed so as to overlap the vessel cap, the embrittlement blocking member being configured to block hydrogen from penetrating into the vessel cap due to internal pressure of the variable vessel or the pressure vessel; and a transmitted hydrogen discharge hole configured to discharge hydrogen that has been transmitted through the embrittlement blocking member to an outside before being introduced into the vessel cap.

2. The variable volume hydrogen container or hydrogen compressor according to claim 1, comprising an external pressure action recess formed between the vessel cap and the embrittlement blocking member, wherein external pressure is applied to the external pressure action recess through the transmitted hydrogen discharge hole.

3. The variable volume hydrogen container or hydrogen compressor according to claim 2, wherein the external pressure action recess is formed in the vessel cap or the embrittlement blocking member so as to have an uneven shape.

4. The variable volume hydrogen container or hydrogen compressor according to claim 1, wherein the embrittlement blocking member is made of a material having hydrogen embrittlement resistance or is coated with a material having hydrogen embrittlement resistance, and the vessel cap is made of a material having no hydrogen embrittlement resistance.

5. The variable volume hydrogen container or hydrogen compressor according to claim 1, wherein the embrittlement blocking member comprises a blocking member seal installed on an edge of the embrittlement blocking member, the blocking member seal being configured to prevent leakage of hydrogen between the pressure vessel or the variable vessel and the embrittlement blocking member.

6. The variable volume hydrogen container or hydrogen compressor according to claim 1, wherein the vessel cap comprises a cap seal configured to form a seal between the vessel cap and the pressure vessel to prevent leakage of hydrogen.

7. The variable volume hydrogen container or hydrogen compressor according to claim 1, comprising a filling nozzle installed through the vessel cap and the embrittlement blocking member, the filling nozzle being configured to supply hydrogen into the variable vessel such that the variable vessel is filled with the hydrogen.

8. The variable volume hydrogen container or hydrogen compressor according to claim 1, wherein the vessel cap or the pressure vessel comprises a compression core portion inserted into the variable vessel such that the hydrogen in the variable vessel is pressurized when the variable vessel contracts, and the embrittlement blocking member is installed so as to wrap a circumference of the compression core portion.

9. The variable volume hydrogen container or hydrogen compressor according to claim 1, wherein the vessel frame comprises:

yoke frame portions located outside the vessel caps, the yoke frame portions being configured to support the vessel cap, each of the yoke frame portions having a outwardly convex curved surface comprising a semi-circle; and side frame portions located at opposite ends of the yoke frame portions such that the pressure vessel is located therebetween, the side frame portions being configured to support the yoke frame portions.

10. The variable volume hydrogen container or hydrogen compressor according to claim 1, wherein the variable vessel is configured by stacking a plurality of ring-shaped plates and joining the plurality of ring-shaped plates in a bellows form.

11. The variable volume hydrogen container or hydrogen compressor according to claim 1, comprising a pressure medium configured to be supplied between the variable vessel and the pressure vessel, wherein the pressure medium pressurizes the variable vessel such that the hydrogen in the variable vessel is compressed or discharged.

12. The variable volume hydrogen container or hydrogen compressor according to claim 1, wherein the vessel frame comprises a support configured to support the vessel assembly on a floor.

* * * * *